Feb. 17, 1931.  T. L. FAWICK  1,792,485
AUTOMOBILE DRIVE
Filed Dec. 4, 1926  2 Sheets-Sheet 2
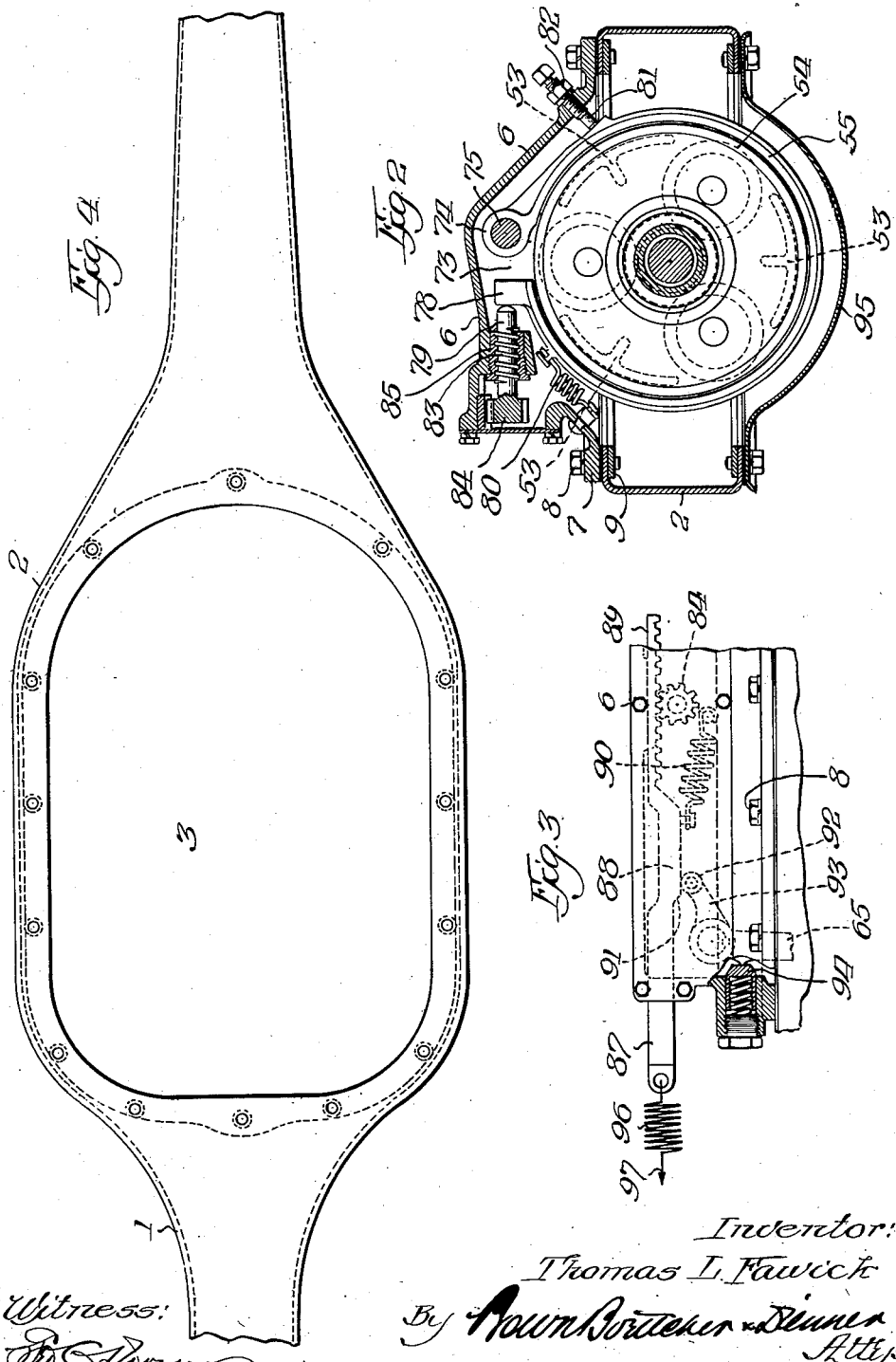
Inventor:
Thomas L. Fawick
By Brown, Boettcher & Dienner
Attys.

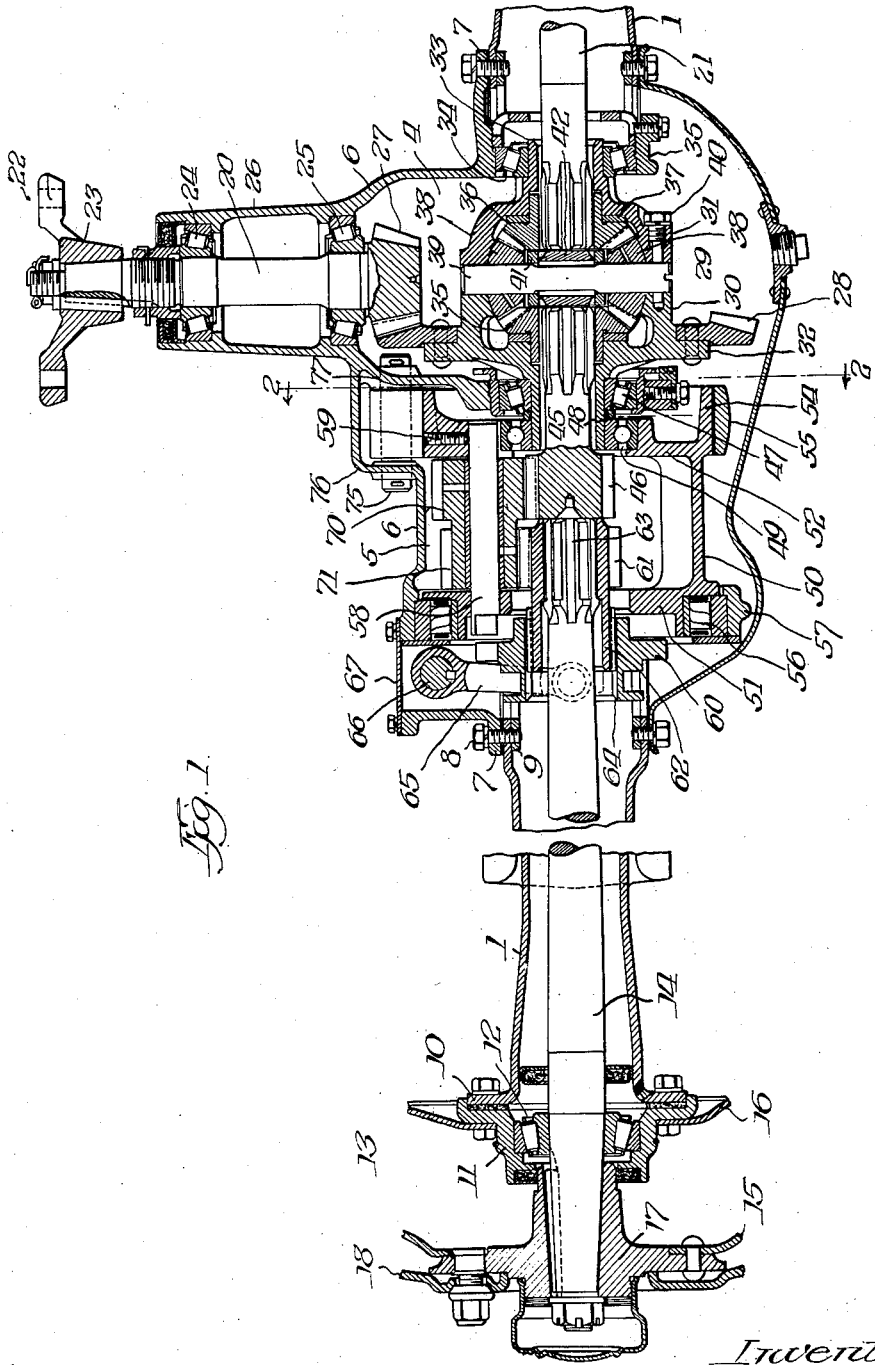

Patented Feb. 17, 1931

1,792,485

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

AUTOMOBILE DRIVE

Application filed December 4, 1926. Serial No. 152,537.

My invention relates to driving mechanism for automobiles, trucks, and the like, and more particularly to a two speed transmission which may be embodied in the propeller shaft drive or in the rear axle drive, or between the engine and the transmission, in fact, anywhere in the line of drive.

While I shall show and describe a specific embodiment of the invention in a rear axle, it is to be understood that the two speed transmission may be embodied in any other part of the drive. Also, while I show in the rear axle construction the transmission as providing either a direct drive or an under drive, it is to be understood that the relation may be reversed, namely, that the transmission may be a direct drive or an over drive. In fact, it merely depends on which direction the power comes from as to whether the transmission is a step up or a step down gearing.

In the specific embodiment in a rear axle, my invention has certain advantages not found in devices of the prior art, first of which is its relatively light weight and ease of manufacture and assembly. The parts are such as to be readily machined at minimum cost, simple operations on relatively small pieces only being required. The parts are readily assembled and supported when in place and the differential and transmission of my invention may be assembled as one unit on a bench assembly and then applied to the axle frame with minimum inconvenience and labor.

I employ the so-called banjo axle frame and the unitary assembly of differential and reduction gear, which is mounted on a plate or frame bolted to one side of said banjo frame and a cover member bolted to the other side. For the same reason that the assembly is inexpensive and convenient, servicing of this device is accompanied with minimum difficulty and expense.

I further wish to call attention to the fact that a relatively large rear axle gear reduction may be thus secured with minimum diameter of axle housing. This is a very desirable feature, particularly for trucks, and the like, where a large reduction is often desired, but as now practiced such a large reduction would necessitate an extremely heavy and bulky housing.

Furthermore, in devices of this general character with which I am familiar, the strain of clutching and unclutching has been imposed upon the bolts which hold the driving parts of the transmission together. In the present case the differential and reduction gear employs a unitary frame which is, therefore, not subject to becoming loosened due to vibration and the shocks incident to change of gear.

Another feature which is of importance in my invention resides in the specific form of gear reduction mechanism, namely, that I employ a positive clutch for direct connection to the gear mechanism or transmission of my invention, but employ a friction clutch for stopping and holding the planetary gears when the transmission operates to change the driving ratio either as a step up or as a step down.

The successful operation of the friction clutch for holding the gear cage stationary is secured by a novel form of brake drum and band which forms a part of the present invention.

In order to acquaint those skilled in the art with the manner of constructing and operating a device embodying my invention, I shall now describe in connection with the accompanying drawings a specific embodiment of the same.

In the drawings:—

Figure 1 is a horizontal section through a rear axle embodying my invention;

Figure 2 is a section taken on the line 2—2 of Figure 1;

Figure 3 is a fragmentary plan view of the common operating means for throwing out the positive clutch and throwing in the friction clutch, and vice versa; and Figure 4 is a rear elevation of the banjo frame of the rear axle.

As shown in the drawings, the rear axle housing 1 has a central open banjo frame 2, the opening 3 in which is of a length suitable to take not only the differential 4, but also the change speed gearing 5. These two operating units, namely, the differential 4 and the change speed gearing 5 are mounted upon a front cover or frame member 6 which has suitable flanges 7 to be bolted by means of cap screws 8 and a clamping ring 9 to the edges of the banjo frame 2.

The reduced axle portions at each side of the banjo frame terminate in flanged plates 10 to which are bolted housings 11 for supporting the roller bearings 12. The wheel 13 is supported in the bearing 12 through the intermediary of the live axle or spindle 14 to the outer end of which the wheel 13 is secured. The wheel 13 carries a suitable brake drum 15 and the bearing member 11 carries a suitable cover 16 upon which may be mounted a brake for cooperating with the drum 15. The hub 17 of the wheel may be of any suitable character and, as shown in the drawing, may support a disk wheel 18 upon the outer periphery of which is mounted a pneumatic tire or the like. The construction of the wheel and its bearing is a matter of the prior art and is well known to those skilled in the art.

The opposite side of the rear axle housing 1 likewise terminates in a wheel support as previously described. The rear axle housing is not symmetrical, the center line of the housing being on line with the propeller shaft and driving pinion shaft 20, and the change speed gear mechanism 5 being disposed at one side, in this case the left side of the center line of the rear axle. As a consequence, the live spindle 14 is shorter than the corresponding live spindle 21, as will be understood from the following description.

The pinion drive shaft 20, which is in reality an extension of the propeller shaft, is driven through a flexible coupling 22, only one side of which 23 is here shown. The flange or fork member 23 of the universal joint is keyed and tapered to the propeller shaft section 20. The shaft 20 is supported in bearings 24 and 25, disposed in a tubular extension 26 of the frame or cover member 6. The inner end of the shaft 20 carries the driving pinion 27, which meshes with the ring gear 28 of the differential 4. This ring gear is secured to the housing 29 of the differential 4. The housing is formed in two parts; namely, 30 and 31. The housing 30 has a bolting flange 32 to which the ring gear 28 is riveted. The housing section 31 has an extension or neck 33 supported in the roller bearing 34. This roller bearing is mounted in a ring 35 which is preferably integral with the frame 6, or which may be part integral and part a split clamp member for forming a complete ring.

Within the differential housing 29 there are mounted the two cone gears 35 and 36 which have extending hubs to provide bearings for these gears within the housing sections 30 and 31. Hardened wear plates or rings 37 are interposed between the backs of the bevel gears 35, 36 and the adjacent portions of the housing sections 30 and 31. The two gears 35 and 36 are connected together by differential pinions 38, which in the present instance are shown as mounted on a pin 39 held in place by a screw pin 40. A similar pair of pinions (not shown), may be mounted on extending pins projecting from the central hub or cage 41 to provide four such pinions between the bevel gears. Suitable wear plates for the outer ends of the pinions may be provided. A central block 42 permitting a small amount of play endwise of the shafts 21 and 14 is supported on the pin 39. The shaft section 21 is splined at its inner end and these splines fit into corresponding splines broached in the bevel gear 36. The bevel gear 35 has similar splines formed therein, and a short shaft section 45 bearing a driving pinion 46 has the enlarged splines at its inner end fitting into the splines in the bevel gear 35.

The hub or neck of the housing section 30 is supported in a bearing 47, which in turn is mounted in a ring which forms a part of the frame 6, being either integral or split. The neck 48 is further extended and carries a bearing 49 for the cage 50 of the change speed gear mechanism 5.

The cage 50 comprises end rings or circular plates 51 and 52 joined by a plurality of webs, in this case three, as shown at 53 in dotted lines in Figure 2.

The end plate or ring 52 is recessed to receive the outer race of the bearing 49, so that this ring is directly supported upon the neck or hub 48, which in turn is supported on the bearing 47.

The ring or end plate 52 is extended outwardly and axially to form and provide a brake drum 54. This part of the cage may be integral or it may be made up of a separate member clamped onto the cage. A spring brake band, which will be described more in detail and shown in section at 55 in Figure 1, is mounted to embrace the drum 54, but normally to be completely clear of the same when the brake is not applied.

At the opposite end of the cage or housing 50 the end member 51 is recessed to receive the inner race of the bearing 56, the outer race thereof being supported in a supporting ring 57 which is preferably a split ring but mounted as a part of the frame 6.

The cage 50 has a series of pins or shafts 58, three in number in the present instance, mounted in the end plates 51 and 52 and suitably secured in said plates as by means of set screws, such as shown at 59. At the left end, as shown in Figure 1, these pins 58 are slabbed off on three sides. These pins are so formed to form clutch dogs cooperating with a movable clutch member 60 which has recesses to cooperate with the ends of said pins 58 to clutch the cage to the driven pinion 61 for direct drive through the change speed gear 5. The clutch plate 60, which cooperates with the dogs formed by the ends of the pins 58, is splined on a sleeve 62 externally, and the opposite end of the sleeve has the pinion 61 formed thereupon. Internally the sleeve is splined to receive the splined inner end 63 of the live spindle 14. The clutch plate 60 has a shifting collar 64 in which there is formed a groove to receive the ends of the shifter fork 65. The shifter fork 65 is mounted on a rock shaft 66 suitably trunnioned in the frame or cover member 6, a removable plate 67 being provided for access thereto.

It will now be seen that the pinions 46 and 61 float loosely in the housing and on the gears which are mounted on the pins 58. The planet gears 70 and 71 are preferably made integral and are provided with anti-friction bushings bearing on the bearing pins 58. There are three sets of these planet gears 70 and 71 arranged at equal intervals about the pinions 46 and 71 and in mesh with them. These pinions 46 and 71 therefore are supported by the planet gears 70 and 71 and hence require no independent bearings. It will be appreciated that since the change speed gear mechanism 5 is mounted in the rear axle such slight noise as there may be will be remote from the driver and hence unobjectionable. In addition, it is to be noted that the speed at which the parts travel with respect to each other is very low, so that gear noises are not developed. The stresses on the individual teeth are also maintained at relatively low values because of the three planet gears 70 and 71 which are in mesh at all times with the pinions 46 and 61.

The spring brake band 55 is preferably formed of a casting in the form of a complete ring and is then machined on its inner surface to a diameter only slightly larger, for example, 1/8th of an inch than the diameter of the drum 54. The drum 54 may likewise be made of cast iron or of malleable iron forming a part of the cage 50, or made of a separate ring and bolted thereto. The brake band 55 is preferably of the same material as the drum, that is, either cast iron, gray cast iron, or malleable, cut open to provide the slot shown at 73 in Figure 2. One end of this brake band is provided with an eye or lug 74 mounted on the bearing pin 75, which pin is held in place in the casing between the webs 76 and 77. The opposite end of the band 55 is provided with a lug 78 which is adapted to be engaged by the thrust pin 79 for contracting the band upon the drum.

A spring 80 normally holds the end of the band expanded against the pin 79 and holds the band against a stop screw 81 which is placed through a part of the housing or frame 6 and adjustable from the outside by means of a suitable head and lock nut 82. This stop bolt 81 is so adjusted as to hold the spring band 55 concentric with the drum 54 and out of contact therewith completely so that no rubbing between the two occurs when the band is not applied.

The band is applied by the thrust pin 79 which carries a thread 83 on the shank thereof and a pinion 84 at the upper end thereof. The threaded shank 83 extends through a threaded nut 85 mounted in a portion of the housing 6. An operating bar on member 87 enters the casing 6, in this case lying in a direction parallel to the longitudinal axis of the axle. This bar is connected by a cable to a suitable pull handle within convenient reach of the operator of the vehicle. For example, a handle may be mounted on the instrument board or on the steering column and arranged to have two positions, in and out, in which the same may be definitely held.

The bar 87 has a cam portion 88 shown in dotted lines in Figure 3, and it has a rack portion 89, which rack portion cooperates with the pinion 84 on the upper end of the thrust pin 79. The bar 87 is normally pulled inwardly by a spring 90, the direction of the pull of the spring being such as to turn the pinion 84 in a direction to raise the thrust pin 79 and thereby release the band 55 from the drum 54.

The cam portion 88 has a throw 91 separating the two dwell portions, and the dwell and throw portions cooperate with a cam follower, in this case a roller 92 fastened upon an arm 93, which arm is integral with the shifter fork 65 on the rock shaft 66 heretofore referred to. A spring plunger 94 bears against the shifter fork 65 and holds the follower 92 in contact with the bar 87.

The operation of the device thus far described is as follows. The rear axle housing 1, which has the banjo frame 2, is arranged with the banjo frame portion 2 vertical in the manner now common in the art with the true opening 3 facing forward and backward. The forward portion is adapted to receive the frame 6 with the assembled differential and change speed gear 5, all assembled and mounted thereupon as a complete unit. The back opening is adapted to be closed by a pressed sheet metal cover 95, such as is die formed, to cooperate with the flanges around the opening 3.

Normally the drive from the propeller shaft comes through the shaft section 20, through the flexible joint 22, driving the pinion 27 and ring gear 28 of the differential. Here the drive is transmitted to the pins 39 and pinions 38 of which, as previously explained, there may be any suitable number, preferably four, and the drive is then transmitted to the gears 35 and 36. Assume that the clutch plate 60 has been thrown inwardly to engage the jaws formed by the ends of the pins 58 so that the cage is keyed to the sleeve 62 and hence to the pinion 61; the shaft section 45 is thereby connected for direct drive to the spindle 14. Under these circumstances the drive from the pinions 38 is transmitted equally through the gears 35 and 36 and the differential rotates as a unit in the manner well known to differentials of this character subject only to the different tractions upon the rear wheels. That is to say, the differential is able to differentiate in the same manner as any standard device of this character. If it is desired to shift from direct drive to the speed reduction which is afforded by the change speed gear 5, the bar 87 is pulled outward into the position shown in Figure 3, whereupon the shifter fork 65 is thrown outwardly to de-clutch the plate 60 and the pins 58 and immediately thereafter to compress or shrink the spring band or brake 55 upon the drum 54 to bring the same to rest. Thereupon the drive from the differential pinions 38 is transmitted to the pinions 36 and 35 at differential rates to correspond to the rate of travel of the shaft section 45 and the live axle 21. In other words, the differential operates to transmit a greater degree of motion to the bevel gear 35 than to the bevel gear 36 owing to the gear reduction between the pinion 46 and the pinion 61 through the planet gears 70 and 71.

It will now be seen that a portion of the movement is transmitted through the differential gears, but the reduction is nevertheless effective. I have provided the cheeks of the bevel gears 35 and 36 with hardened wear plates which are preferably pinned to the halves of the differential housings 30 and 31 to adapt them to take care of the greater degree of wear which is encountered in this construction.

While the change speed gear 5 is shown as being mounted on one of the live spindles, it is to be understood that the same may be mounted on the shaft section 20, that is, directly in line with the propeller shaft drive either on the rear axle housing 6 or it may be mounted back of the transmission, as shown in my co-pending application Serial No. 162,472, filed Jan. 21, 1927.

It is to be noted that in the operation of the clutch plate 60 and the clutch or brake band 55 the clutch is released before the brake band 55 is applied to the drum 54. This means that for a short space of time during the shifting there is a neutral position where the engine drive is interrupted. The tendency of the engine, therefore, assuming that it remains connected, that is, is not de-clutched, is to spin the drum 54 through the action of the differential gear. However, the application of the brake band immediately slows down the drum 54 and the cage 50 so that power is transmitted through the differential to the live axle 21 and also a portion thereof through the gears 70 and 71 to the pinion 61 and thence to the live axle 14.

It is to be noted that when the change speed gear 5 is thrown to the position of gear reduction, it is necessary that the shaft section 45 and pinion 46 be speeded up above their previous speed. This is admirably accomplished in the present device through the action of the differential and hence the shift may be accomplished very smoothly without de-clutching the engine.

Upon shifting the change speed gear 5 in the opposite direction the band 55 first releases the drum 54, whereupon the cage tends to speed up due to the drive from the propeller shaft and due to the fact that the velocity of the vehicle drives the live spindles 21 and 14. The spindles 21 and 14 travel at the same speed due to their engagement with the road surface and consequently there is a tendency for the cage to assume the same speed, and the clutch plate 60 and the pins 58 may be readily engaged without appreciable shock.

If desired, the engagement between the pinion 61 and the cage 50 may be secured through a like spring brake band, either internal or external. I find that this specific form of brake band and drum is highly efficient even if running in oil. The band is applied to the rotating drum in such a direction that the band tends to wrap itself around the drum in the direction of rotation when pressure is applied. Normally the inherent resiliency of the band makes it assume its true circular form out of contact with the rotating drum, and this form of brake and drum is highly efficient and desirable, where for normal disengagement of the parts no rubbing is to be permitted.

It is to be understood that the thrust pin 79 may be operated by other means than the rack and pinion and thread, which I have specifically shown.

It is furthermore to be noted that in the form of the device which I have shown the wear which may occur on the band does not interfere with the operative relation between the dog clutch and the band clutch, since wear on the band will require merely that the bar 87 be pulled slightly further in order to tighten the clutch band.

I may provide spring means normally loaded sufficiently heavy to apply the clutch band and employ manual means for restraining said spring means so that the band may be applied with a suitable resilient pressure, or a spring may be inserted in the pull cable 97 connected to the bar 87 so that even though it may be necessary to allow for variations of position of the bar 87 due to wear on the band or other parts, the operating or pull mechanism on the cable 97 may move between fixed points. In such event the spring 96 is of sufficient power to apply the necessary pressure to the band 55 and take up the play due to wear.

The ease of construction and bench assembly which this device permits is of great value in assembling or servicing the device.

The present transmission has the specific virtue that the parts are solidly clutched, i. e., by positive jaw clutches when the device is direct, and the friction clutch is employed to slow down the cage and hold it when the drive is through the gears. This advantage holds whether the device is embodied in the rear axle or in front of the transmission or behind the transmission in the line of drive.

After the resilient clutch band once seizes the drum it will hold regardless of the direction of drive through the cage. It is a characteristic of this form of clutch that it will seize quite violently, and that is a desirable characteristic in this device whether used as an external band and drum or an internal band and drum.

I do not intend to be limited to the details shown or described.

I claim:

1. In an axle, a housing comprising an enlarged banjo frame, a frame and cover member for one side of said banjo frame, a cover member for the opposite side of the banjo frame, a differential gear having bearings mounted on said cover frame, a change speed gear having a bearing in said cover frame and a bearing on a portion of said differential, said differential and said change speed gear having splined sockets for receiving live spindles axially in alignment.

2. In combination, a cover frame member having bearings, a driving shaft section mounted in said bearings, a differential having bearings on each side thereof in said cover frame member and having a ring gear meshing with a pinion on said driving shaft section, a change speed gear having a bearing on said cover frame, said change speed gear comprising a cage having a plurality of planet gears, said cage having an external bearing in said cover frame, and having an internal bearing on a portion of said differential.

3. In combination, a rear axle housing having an open banjo frame, a cover frame having flanges cooperating with one side of the banjo frame, a driving shaft entering said cover frame at substantially right angles to the longitudinal axis of the axle housing, said shaft having a driving pinion, a differential gear comprising a housing bearing a ring gear, differential gears and pinions within said housing, said housing having a neck or hub at each end, bearings for said hubs on said cover frame, a gear cage having a bearing at one end in the cover frame, and having a bearing at the other end on one of said hubs.

4. In combination, a cover frame member, a differential gear having a housing, said housing having axially extending hubs, bearings in the cover frame member for said hubs, a gear cage having a bearing on said cover frame member at one end, a bearing on one of the hubs of the differential housing at the other end, a plurality of dual planet gears mounted in said cage, a pinion keyed at one end to a differential gear and bearing a pinion at the other end meshing with said planet gears, a sleeve member having a pinion in alignment with the first pinion and meshing with said planet gears, said sleeve being splined to receive a live spindle internally and being splined externally, a clutch member mounted on said spline, clutch dogs on the cage cooperating with said clutch member, a clutch drum on the cage, a resilient metal brake band mounted concentrically with the drum and supported in the cover frame member, means for operating the clutch member, and means for contracting said band.

5. In combination, an axle housing having tubular ends and an open banjo frame providing an eccentric oblong opening, a cover frame having flanges cooperating with the open banjo frame, said cover frame member having a differential mounted centrally of the axle housing and having an optionally operable reduction gear mechanism mounted on the cover frame member adjacent the differential, said differential and reduction gear mechanism being adapted to be inserted into the open banjo frame through the oblong eccentric opening, and means including parts mounted on the cover frame member to control the operation of the reduction gear mechanism.

6. In a motor driven vehicle, a propeller shaft, a rear axle having a pair of driving spindles for driving wheels, one of said spindles being cut into two parts, a planetary gearing connecting the adjacent ends of the two spindle parts for reducing the speed of both spindles by a gear reduction in one spindle, a differential gear connecting the propeller shaft with one part of one spindle and with the other spindle and a cage mounting the planet gears and having support upon the opposite sides of the cut separating one of said spindles into two parts.

7. In a motor driven vehicle, a propeller shaft, a rear axle having a pair of driving spindles for driving the wheels, one of said spindles being cut into two parts, a planetary gearing connecting the adjacent ends of the two spindle parts for reducing the speed of both spindles by a gear reduction in one spindle, a differential gear connecting the propeller shaft with one part of one spindle and with the other spindle, a cage mounting the planet gears and having support on the opposite sides of the cut separating one of said spindles into two parts, and a cover frame supporting both the differential and said planet gear cage.

8. In combination, a cover frame member having bearings, a driving shaft section mounted in said bearings, a differential having bearings at each side thereof in said cover frame member and having a ring gear meshing with a pinion on said driving shaft section, a change speed gear comprising a cage having a plurality of planet gears, said cage having a bearing on said cover frame and having a bearing on a portion of said differential.

In witness whereof, I hereunto subscribe my name this 1st day of December, 1926.

THOMAS L. FAWICK.